(12) United States Patent
Chen

(10) Patent No.: US 10,895,700 B2
(45) Date of Patent: Jan. 19, 2021

(54) OPTICAL SUB-ASSEMBLY MODULE AND CAP THEREOF

(71) Applicant: AXCEN PHOTONICS CORP., New Taipei (TW)

(72) Inventor: Yi-Ming Chen, Hsinchu County (TW)

(73) Assignee: AXCEN PHOTONICS CORP., New Taipei (TW)

( * ) Notice: Subject to any disclaimer, the term of this patent is extended or adjusted under 35 U.S.C. 154(b) by 90 days.

(21) Appl. No.: 16/258,759

(22) Filed: Jan. 28, 2019

(65) Prior Publication Data

US 2020/0103606 A1  Apr. 2, 2020

(30) Foreign Application Priority Data

Oct. 1, 2018  (TW) .............................. 107134643 A

(51) Int. Cl.
*G02B 6/42* (2006.01)
*G02B 7/02* (2006.01)

(52) U.S. Cl.
CPC ........... *G02B 6/4206* (2013.01); *G02B 6/423* (2013.01); *G02B 6/428* (2013.01); *G02B 6/4292* (2013.01); *G02B 7/022* (2013.01)

(58) Field of Classification Search
CPC .... G02B 6/4292; G02B 6/4206; G02B 6/423; G02B 6/428; G02B 7/022
See application file for complete search history.

(56) References Cited

U.S. PATENT DOCUMENTS

| 5,495,545 | A | 2/1996 | Cina et al. | |
|---|---|---|---|---|
| 6,550,983 | B1* | 4/2003 | Gilliland | G02B 6/4204 385/88 |
| 9,297,970 | B1* | 3/2016 | Chan | G02B 6/4253 |
| 2005/0286579 | A1* | 12/2005 | Yoshikawa | H01L 23/4093 372/36 |
| 2011/0097039 | A1* | 4/2011 | Zhao | G02B 6/4292 385/70 |
| 2014/0029900 | A1* | 1/2014 | Logan, Jr. | G02B 6/3821 385/92 |

(Continued)

FOREIGN PATENT DOCUMENTS

| CN | 103907250 A | 7/2014 |
|---|---|---|
| JP | 9186395 A | 7/1997 |
| JP | 200284027 A | 3/2002 |

(Continued)

*Primary Examiner* — Thomas A Hollweg
*Assistant Examiner* — Mary A El-Shammaa
(74) *Attorney, Agent, or Firm* — Li & Cai Intellectual Property (USA) Office

(57) ABSTRACT

An optical sub-assembly module and a cap thereof are provided. Two opposite ends of the cap are respectively defined as a light source end and a connecting end. The cap includes a receiving groove, a longitudinal groove, a lens structure and a plurality of pillar structures. The receiving groove is recessed inwardly from the light source end. The longitudinal groove is recessed inwardly from the connecting end. The lens structure is integrally formed with the cap, the lens structure is located between the receiving groove and the longitudinal groove, and the lens structure blocks spatial communication between the receiving groove and the longitudinal groove. Each of the pillar structures is connected to an inner wall that surrounds the receiving groove.

8 Claims, 15 Drawing Sheets

(56) References Cited

U.S. PATENT DOCUMENTS

2014/0233896 A1* 8/2014 Ishigami .............. G02B 6/4256
                                                          385/81
2014/0328559 A1* 11/2014 Kobayashi ........... G02B 6/4292
                                                          385/72

FOREIGN PATENT DOCUMENTS

| JP | 2004239997 A | 8/2004 |
| JP | 2005183519 A | 7/2005 |
| TW | 200422684 A | 11/2004 |
| TW | 200942889 A1 | 10/2009 |

* cited by examiner

OPTICAL SUB-ASSEMBLY MODULE AND CAP THEREOF

CROSS-REFERENCE TO RELATED PATENT APPLICATION

This application claims the benefit of priority to Taiwan Patent Application No. 107134643, filed on Oct. 1, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical communication component, and more particularly to an optical sub-assembly module and a cap thereof.

BACKGROUND OF THE DISCLOSURE

Referring to FIG. 1 to FIG. 3, a conventional optical sub-assembly module 1 is illustrated. The optical sub-assembly module 1 includes a cover body 10, a lens holder 11 and a light emitting component 12. The cover body 10 has a through groove 101 formed therein, a side of the lens holder 11 has a recess 111 recessed therein, and another side of the lens holder 11 opposite to the recess 111 is provided with a glass lens 13. The light emitting component 12 includes a light emitting unit 121.

The lens holder 11 is generally made of metal. The glass lens 13 is disposed on the lens holder 11 in such a manner that a liquid glass in a high-temperature is dripped on a via hole of the lens holder 11 through natural dripping so as to form the glass lens 13 as shown in FIG. 1.

The optical sub-assembly module 1 is assembled in such a manner that the lens holder 11 having the glass lens 13 is fixedly disposed on a side of the light emitting component 12 that includes the light emitting unit 121 such that the light emitting unit 121 is correspondingly located in the recess 111; and then the lens holder 11 and the light emitting component 12 are fixedly disposed on a side of the cover body 10.

Referring to FIG. 2, a cross-sectional view showing the conventional optical sub-assembly module 1 in an assembled state is illustrated. The conventional optical sub-assembly module 1 may have a problem that the glass lens 13 is not correctly located on a central axis C2 of the lens holder 11 during various production processes. However, in the assembly process, a central axis of the glass lens 13 must substantially overlap a central axis C1 of the through groove 101 such that a light beam passing through the glass lens 13 can be correctly emitted from a side of the cover body 10 away from the glass lens 13. Accordingly, in order to overlap the central axis of the glass lens 13 with the central axis C1 of the through groove 101, the relevant manufacturer can only adjust the volume of UV glue 14 between the lens holder 11 and the cover body 10.

Referring to FIG. 3, in the practical production of the optical sub-assembly module 1, although the central axis of the glass lens 13 is located on the central axis of the lens holder 11, the relevant manufacturer may need to dislocate the lens holder 11 from the light emitting component 12 (the position of W as indicated in FIG. 3) in order to enable the light emitting unit 121 to be located on the central axis of the glass lens 13 (i.e. the central axis C1 of the through groove 101). For this reason, in the process of fixing the lens holder 11 and the light emitting component 12, which are dislocated from each other, in order to the cover body 10, the relevant manufacturer need to adjust the volume of the UV glue 14 between the lens holder 11 and the cover body 10 so as to overlap the central axis of the glass lens 13 with the central axis C1 of the through groove 101.

As described above, in the production process of the conventional optical sub-assembly module 1, when the glass lens 13 is not disposed at the desired position on the lens holder 11 or when the lens holder 11 and the light emitting component 12 are dislocated from each other, the volume of the UV glue 14 between the lens holder 11 and the cover body 10 must be adjusted to overlap the central axis of the glass lens 13 with the central axis of the through groove 101, and to enable the light emitting unit 121 to be located on the central axis of the through groove 101.

However, as shown in FIG. 1, both the lens holder 11 and the cover body 10 are cylindrical. When the lens holder 11 and the cover body 10 are fixed to each other via the UV glue 14, the UV glue 14 is in a liquid state. Therefore, it is difficult for the relevant manufacturer to accurately control the amount of the UV glue 14 in the production process to reach the state shown in FIG. 2 or FIG. 3. In other words, when the conventional optical sub-assembly module 1 has the above problems, the production yield will be difficult to control, thereby reducing the production yield.

In this regard, the present disclosure provides an optical sub-assembly module and a cap thereof to overcome the aforementioned drawbacks.

SUMMARY OF THE DISCLOSURE

In response to the above-referenced technical inadequacies, the present disclosure provides an optical sub-assembly module and a cap thereof for improving the problem that the production yield of the conventional optical sub-assembly module may be reduced since either the glass lens, the cover body or the light emitting component has a production error, which causes the situations that the glass lens and the lens holder are not fixed to each other in a predetermined manner, or the lens holder and the light emitting component are not fixed to each other in a predetermined manner. In addition, the conventional optical sub-assembly module need to be produced by at least two alignment operations, one of which is the alignment operation between the lens holder and the light emitting component, and the other is the alignment operation between the lens holder and the cover body. Accordingly, the conventional optical sub-assembly module has the problems of long assembly time and low production efficiency.

In one aspect, the present disclosure provides an optical sub-assembly module which includes a cap and a light source module. Two opposite ends of the cap are respectively defined as a light source end and a connecting end. The cap includes a receiving groove, a longitudinal groove, a lens structure and a plurality of pillar structures. The receiving groove is recessed inwardly from the light source end. The longitudinal groove is recessed inwardly from the connecting end. The lens structure is integrally formed with the cap, the lens structure is located between the receiving groove and the longitudinal groove, and the lens structure blocks spatial communication between the receiving groove and the longitudinal groove. The pillar structures each is connected to an inner wall that surrounds the receiving groove. The light source module includes a light emitting component, a base seat and a plurality of pins. The light emitting component includes a light emitting unit capable of emitting a light beam having a predetermined wavelength. A side of the base seat is concavely formed with a recess, the light emitting component is fixedly disposed in the base seat, and the light emitting component is located in the recess. The pins are respectively and electrically connected to the light emitting component, and the pins are respectively and electrically connected to the light emitting unit. The base seat is disposed in the receiving groove, and each pillar structure is configured to correspondingly abut against a periphery of the base seat such that the base seat is fixedly disposed at the light source end of the cap. The light beam emitted from the light emitting component can sequentially pass through the lens structure and the longitudinal groove, and then be emitted outward from the connecting end of the cap.

In one aspect, the present disclosure also provides a cap of an optical sub-assembly module. Two opposite ends of the cap are respectively defined as a light source end and a connecting end. The cap includes a receiving groove, a longitudinal groove, a lens structure and a plurality of pillar structures. The receiving groove is recessed inwardly from the light source end. The longitudinal groove is recessed inwardly from the connecting end. The lens structure is integrally formed with the cap, the lens structure is located between the receiving groove and the longitudinal groove, and the lens structure blocks spatial communication between the receiving groove and the longitudinal groove. The pillar structures each is connected to an inner wall that surrounds the receiving groove.

The advantage of the present disclosure is that since the inside of the cap of the optical sub-assembly module has an integrally formed lens structure, the relevant operator only need to perform a positioning operation between the cap and the light emitting component when assembling the optical sub-assembly module. Therefore, the optical sub-assembly module of the present disclosure has a relatively short assembly time and better production efficiency compared to that of the above-mentioned conventional optical sub-assembly module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
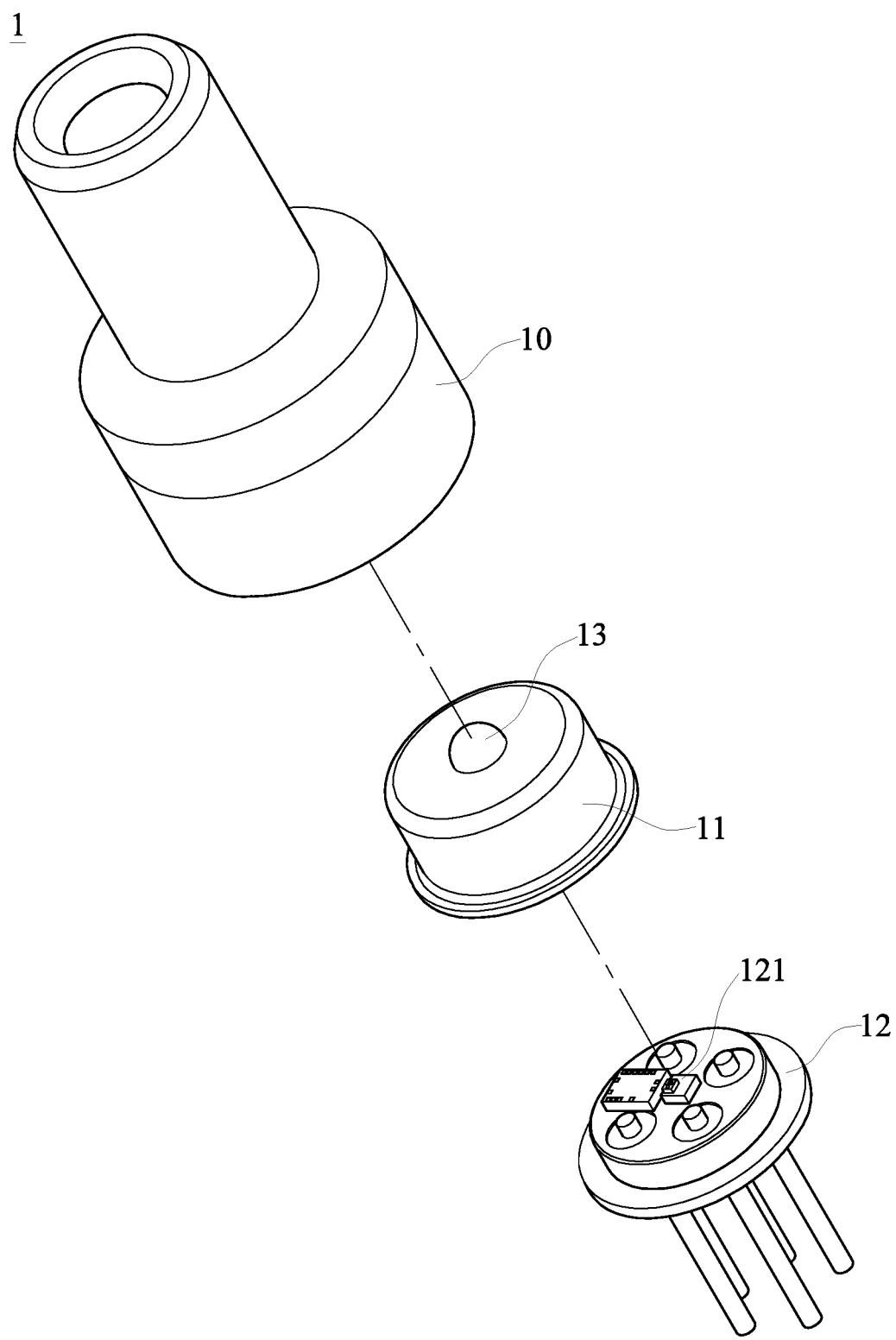
FIG. 1 is an exploded view showing a conventional optical sub-assembly module.
Figure 2:
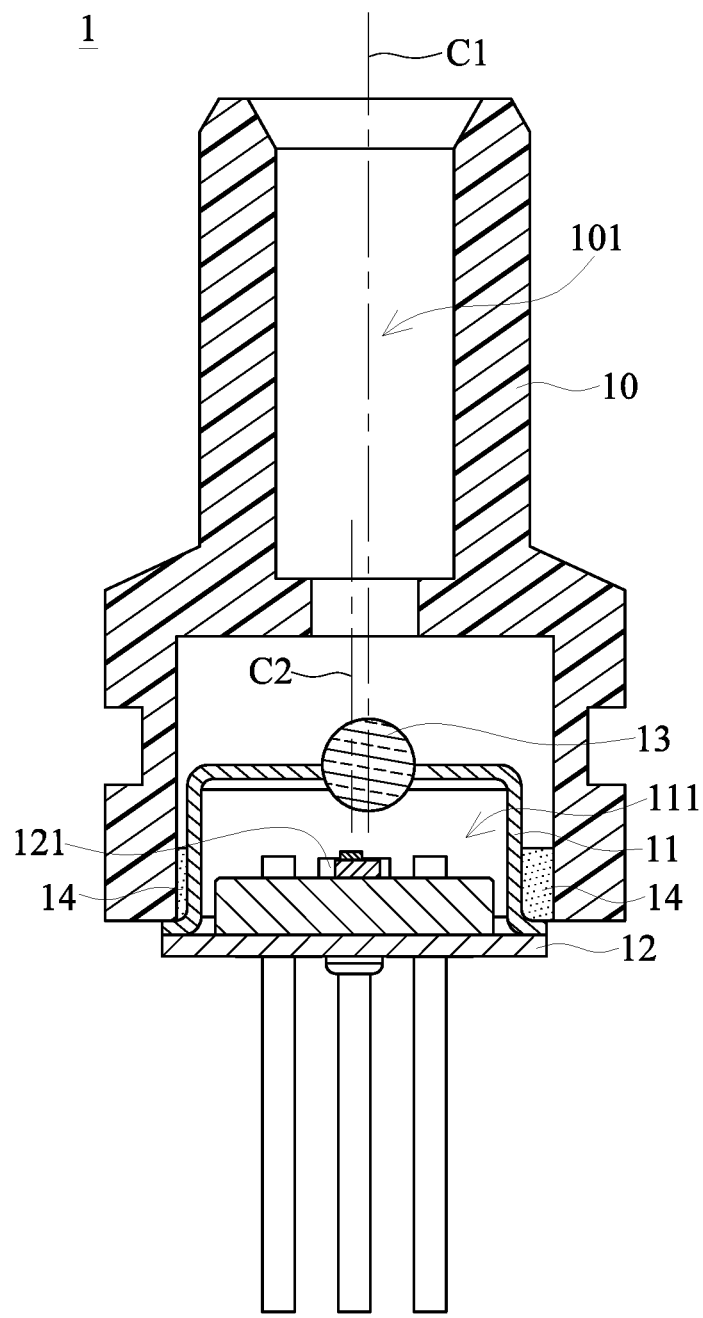
FIG. 2 is a cross-sectional view showing the conventional optical sub-assembly module in an assembled state.
Figure 3:
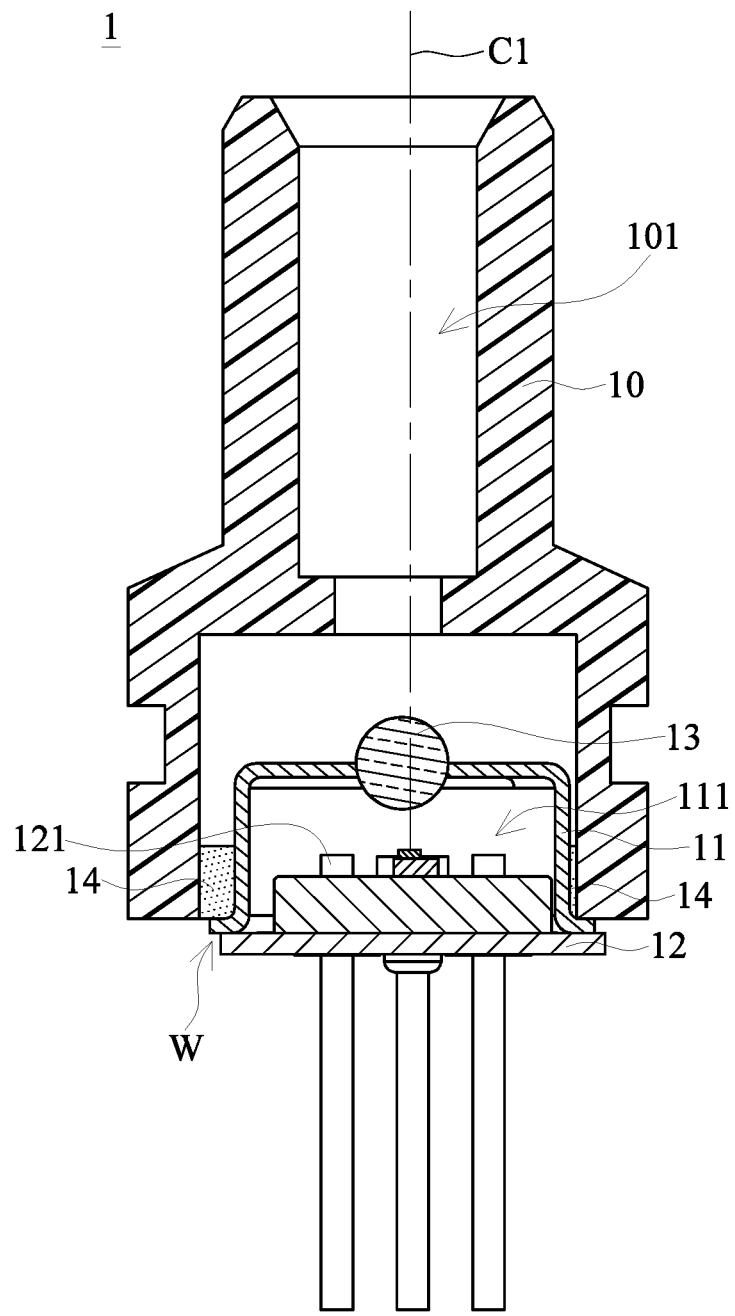
FIG. 3 is a cross-sectional view showing the conventional optical sub-assembly module in another assembled state.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 4 to FIG. 7, the present embodiment discloses an optical sub-assembly module 2 which includes a cap 20 and a light source module 21. The cap 20 is fixedly disposed on a side of the light source module 21. The light source module 21 has a base seat 211, a light emitting component and a plurality of pins 213.

Figure 7:
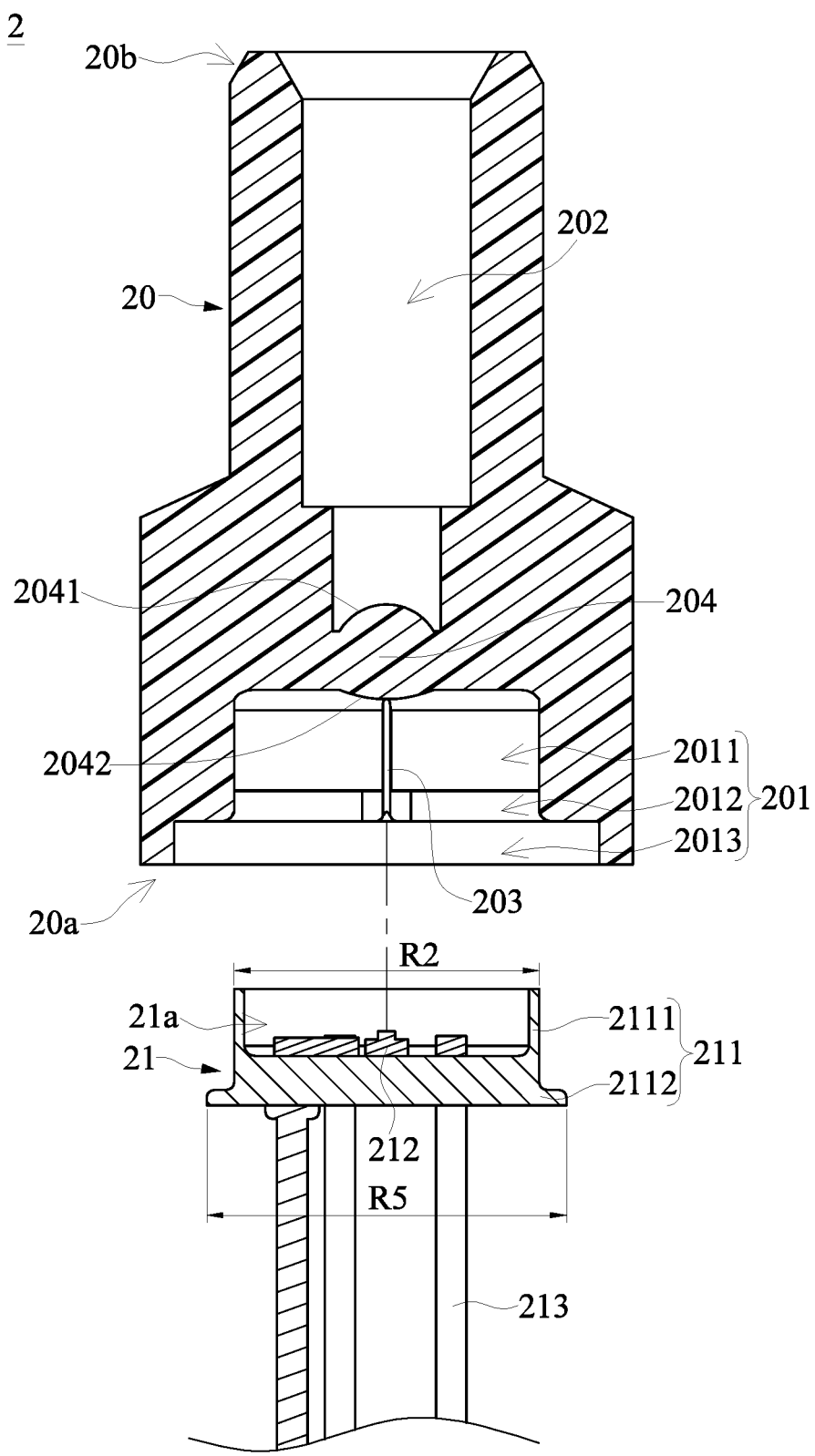
FIG. 7 is a cross-sectional view of FIG. 6.
Figure 8:
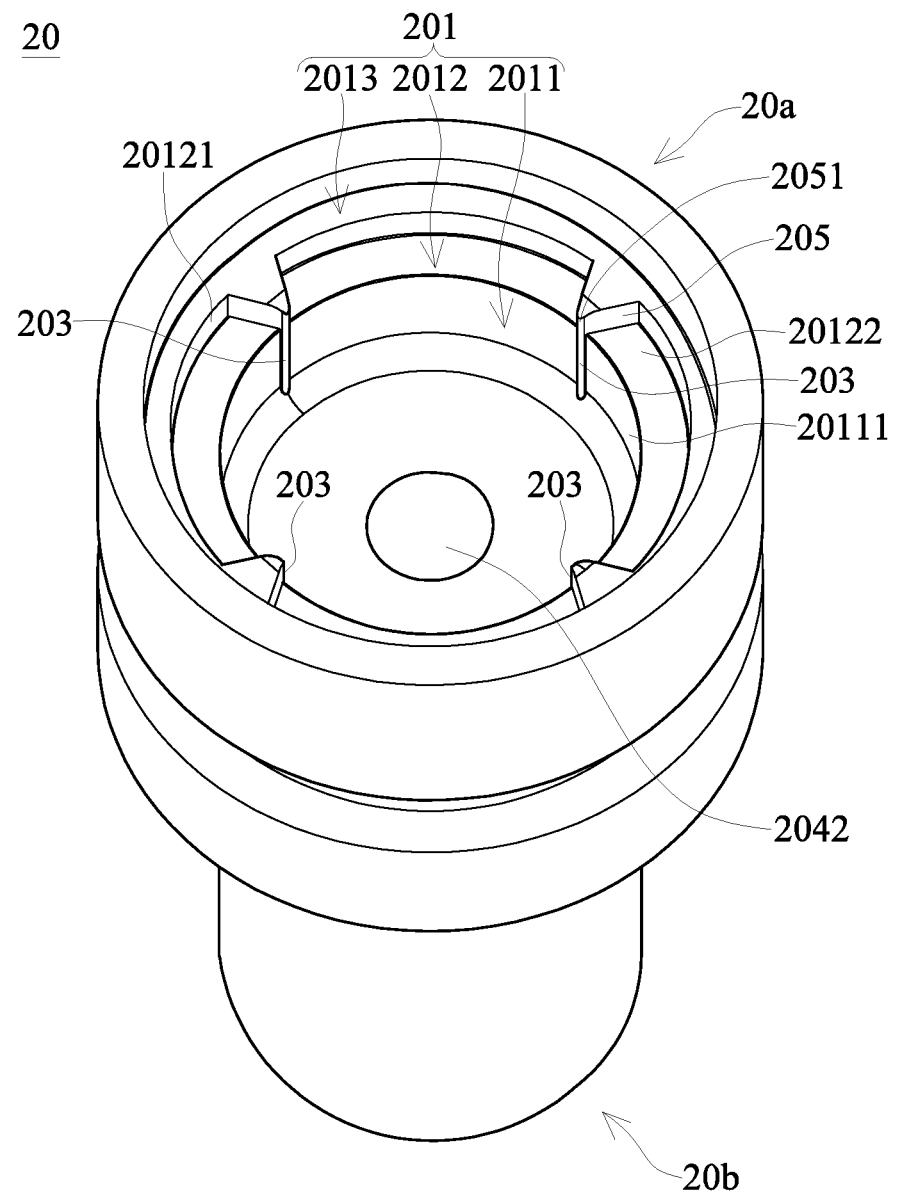
FIG. 8 is a perspective view showing a cap of the optical sub-assembly module according to the embodiment of the present disclosure.
Figure 9:
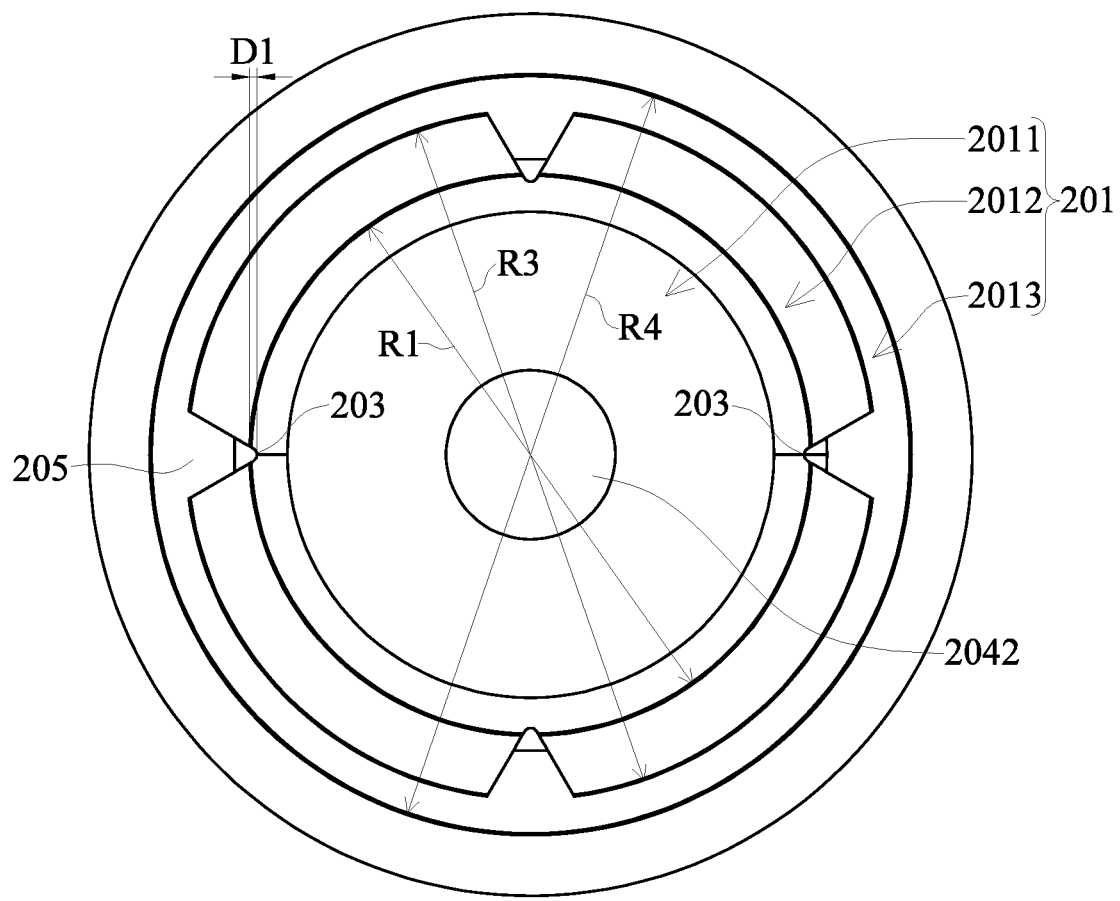
FIG. 9 is a top plan view showing the cap of the optical sub-assembly module according to the embodiment of the present disclosure.

Referring to FIG. 7 to FIG. 9, the cap 20 of the optical sub-assembly module 2 of the present embodiment is illustrated. Two opposite ends of the cap 20 are respectively defined as a light source end 20a and a connecting end 20b. The cap 20 has a receiving groove 201, a longitudinal groove 202, four pillar structures 203 and a lens structure 204 inside.

The cap 20 is concaved inwards to form the receiving groove 201 from the light source end 20a. More specifically, the receiving groove 201 is divided into a first receiving groove 2011, a second receiving groove 2012 and a third receiving groove 2013. The first receiving groove 2011 is disposed close to the connecting end 20b, the third receiving groove 2013 is disposed close to the light source end 20a, and the second receiving groove 2012 is located between the first receiving groove 2011 and the third receiving groove 2013. That is, the receiving groove 201 is sequentially divided into the first receiving groove 2011, the second receiving groove 2012 and the third receiving groove 2013 from the connecting end 20b toward the light source end 20a.

Referring to FIG. 7 to FIG. 9, an inner diameter R1 of the first receiving groove 2011 is substantially the same as an outer diameter R2 of an annular wall 2111 of the base seat 211, and an inner diameter R3 of the second receiving groove 2012 is greater than the inner diameter R1 of the first receiving groove 2011, and an inner diameter R4 of the third receiving groove 2013 is greater than the inner diameter R3 of the second receiving groove 2012. The difference between the inner diameter R3 of the second receiving groove 2012 and the inner diameter R1 of the first receiving groove 2011 can be designed according to requirements, and the difference between the inner diameter R4 of the third receiving groove 2013 and the inner diameter R3 of the second receiving groove 2012 can also be designed according to requirements.

It should be noted that the receiving groove 201 of the present embodiment is divided into the first receiving groove 2011, the second receiving groove 2012 and the third receiving groove 2013, but the present disclosure is not limited thereto. For example, the receiving groove 201 may merely have the first receiving groove 2011, or the receiving groove 201 may be divided into the first receiving groove 2011 and the second receiving groove 2012.

The cap 20 is concaved inwards to form the longitudinal groove 202 from the connecting end 20b. The longitudinal groove 202 may have a cylindrical shape. The depth and shape of the longitudinal groove 202 can be designed according to requirements. The lens structure 204 is integrally formed with the cap 20. The lens structure 204 is located between the receiving groove 201 and the longitudinal groove 202, and the lens structure 204 blocks the spatial communication between the receiving groove 201 and the longitudinal groove 202.

Referring to FIG. 7, the lens structure 204 has a light exit surface 2041 facing towards the longitudinal groove 202, and the lens structure 204 has a light incident surface 2042 facing towards the receiving groove 201. Both the light exit surface 2041 and the light incident surface 2042 can be designed according to requirements. For example, the light exit surface 2041 and the light incident surface 2042 may be multiple curvature surfaces, respectively. The lens structure 204 refers to a structure that allows a light beam emitted from a light emitting unit 212 to pass through, and the lens structure 204 is configured to condense the light beam emitted from the light emitting unit 212. That is, the lens structure 204 can achieve an effect equivalent to a convex lens.

Figure 4:
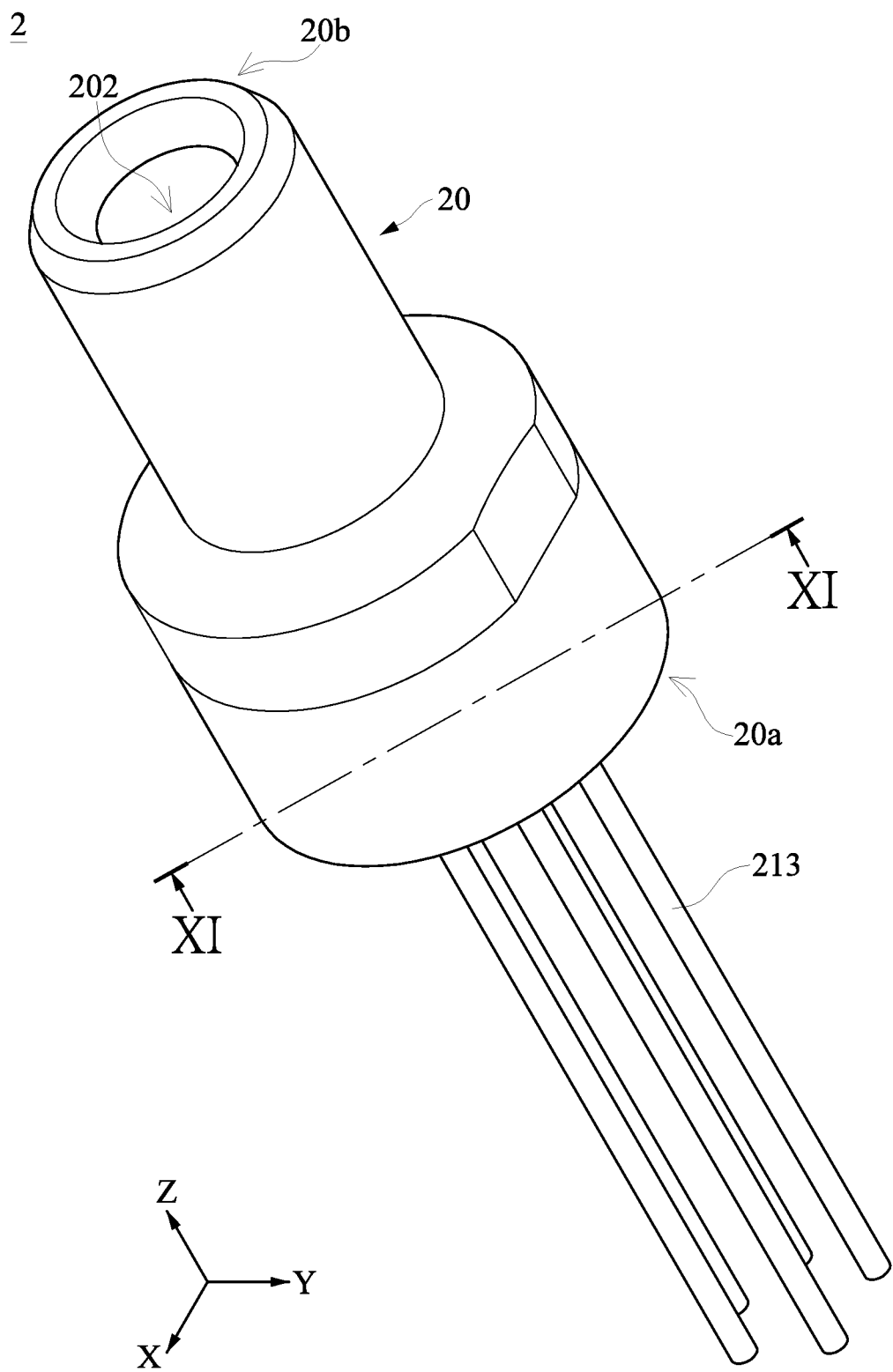
FIG. 4 is a perspective view showing an optical sub-assembly module in an assembled state according to an embodiment of the present disclosure.
Figure 5:
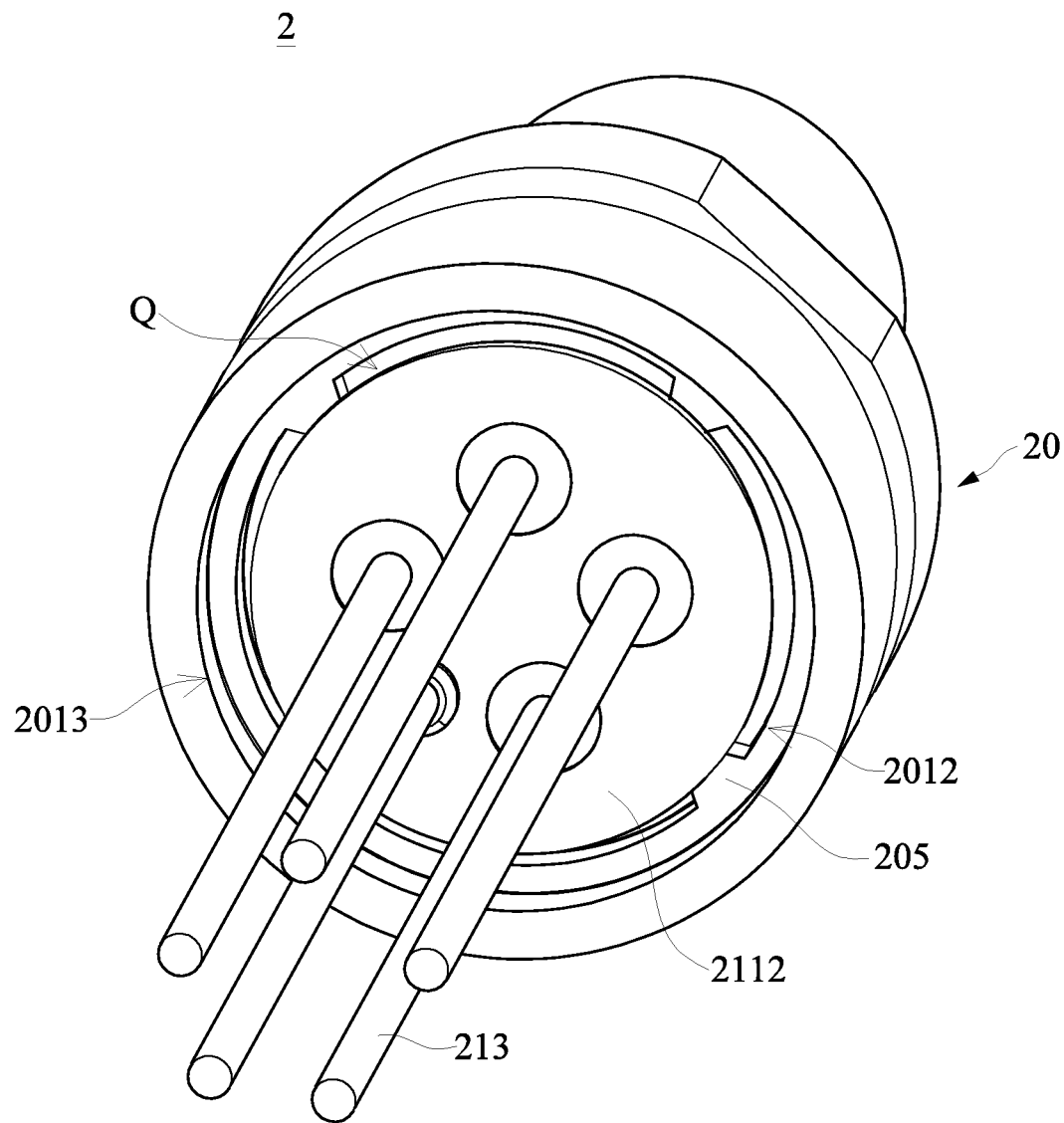
FIG. 5 is another perspective view showing the optical sub-assembly module in the assembled state according to the embodiment of the present disclosure.

Referring to FIG. 8 and FIG. 9, the four pillar structures 203 are respectively connected to an inner wall 20111 that surrounds the receiving groove 201. That is, the four pillar structures 203 respectively extend from the inner wall 20111 that surrounds the receiving groove 201 toward the inside of the receiving groove 201. The four pillar structures 203 are spaced apart from each other, in which two of the pillar structures 203 are disposed to face each other, and the other two of the pillar structures 203 are also disposed to face each other. In the present embodiment, although the cap 20 having the four pillar structures 203 is taken as an example, the present disclosure is not limited thereto. In practical applications, the number of the pillar structures 203 of the cap 20 and the position of the pillar structures 203 with respect to the receiving groove 201 may be varied according to requirements. It should be noted that in the embodiment in which the cap 20 has three pillar structures 203, the relevant operator has to pay attention to whether the base seat 211 is inclined with respect to the cap 20 in the X-Y plane as shown in FIG. 4 during the process of fixing the base seat 211 to the receiving groove 201 of the cap 20. In contrast, in the embodiment in which the cap 20 has four pillar structures 203, the base seat 211 can be firmly disposed in the cap 20, and the problem that the base seat 211 may be inclined with respect to the cap 20 can be effectively improved.

Referring to FIG. 8, in practical application, the cap 20 further has four limiting structures 205, each of the limiting structures 205 is located in the receiving groove 201, and each of the limiting structures 205 is disposed close to the light source end 20a. The four limiting structures 205 respectively extend from an inner wall 20121 that surrounds the second receiving groove 2012 toward the inside of the receiving groove 201. The four limiting structures 205 are spaced apart from each other. Each of the limiting structures 205 may be a triangular columnar structure, and a side edge portion 2051 of each of the limiting structures 205 is located within an outline of an orthographic projection of the first receiving groove 2011 toward the light source end 20a. The side edge portion 2051 of each of the limiting structures 205 may extend toward the first receiving groove 2011 to form the corresponding pillar structure 203. That is, the side edge portion 2051 of each of the limiting structures 205 is configured to abut against a periphery of the base seat 211. In another embodiment of the present disclosure, the cap 20 may have no limiting structure 205. In addition, the shape and number of the limiting structures 205 may be varied according to requirements and is not limited to those shown in the drawings.

Figure 6:
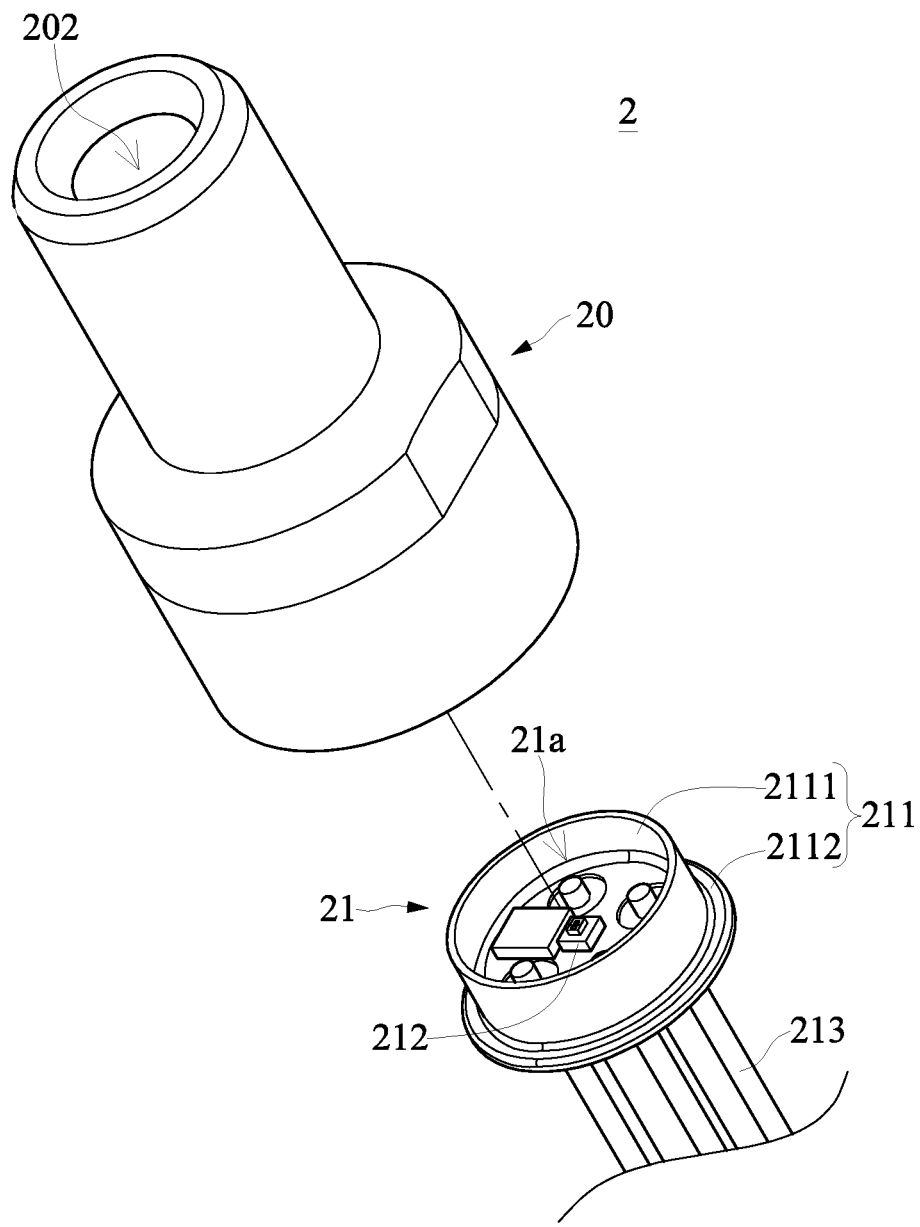
FIG. 6 is an exploded view showing the optical sub-assembly module according to the embodiment of the present disclosure.

Referring to FIG. 6 and FIG. 7, the light source module 21 has the base seat 211, the light emitting component and the pins 213 described above. A side of the base seat 211 is concavely formed with a recess 21a. The base seat 211 has an annular wall 2111 and a bottom plate 2112. The annular wall 2111 is fixedly disposed on a side of the bottom plate 2112. The annular wall 2111 and the bottom plate 2112 commonly surround the groove 21a, in which an outer diameter R5 of the bottom plate 2112 is greater than the outer diameter R2 of the annular wall 2111, the outer diameter R2 of the annular wall 2111 is greater than the inner diameter R1 of the first receiving groove 2011 as shown in FIG. 9, and the outer diameter R2 of the annular wall 2111 is less than the inner diameter R3 of the second receiving groove 2012 as shown in FIG. 9, but the present disclosure is not limited thereto. In different embodiments, the outer diameter R5 of the bottom plate 2112 may also be the same as the outer diameter R2 of the annular wall 2111.

The light emitting component may include members such as the light emitting unit 212, a driving component, and a controller. The members are fixedly disposed on the bottom plate 2112 of the base seat 211, and the members are correspondingly located in the recess 21*a*. The type, shape, and wavelength of the light beam emitted from the light emitting unit 212 can be designed according to actual needs, and the present disclosure is not limited thereto.

One end of each of the pins 213 is fixedly disposed to the base seat 211 and is electrically connected to the light emitting component. The pins 213 can be electrically connected to an external electronic device to receive the power required by the light emitting unit 212 and to transmit an associated control signal to the controller of the light emitting component to control the light emitting unit 212.

Figure 10:
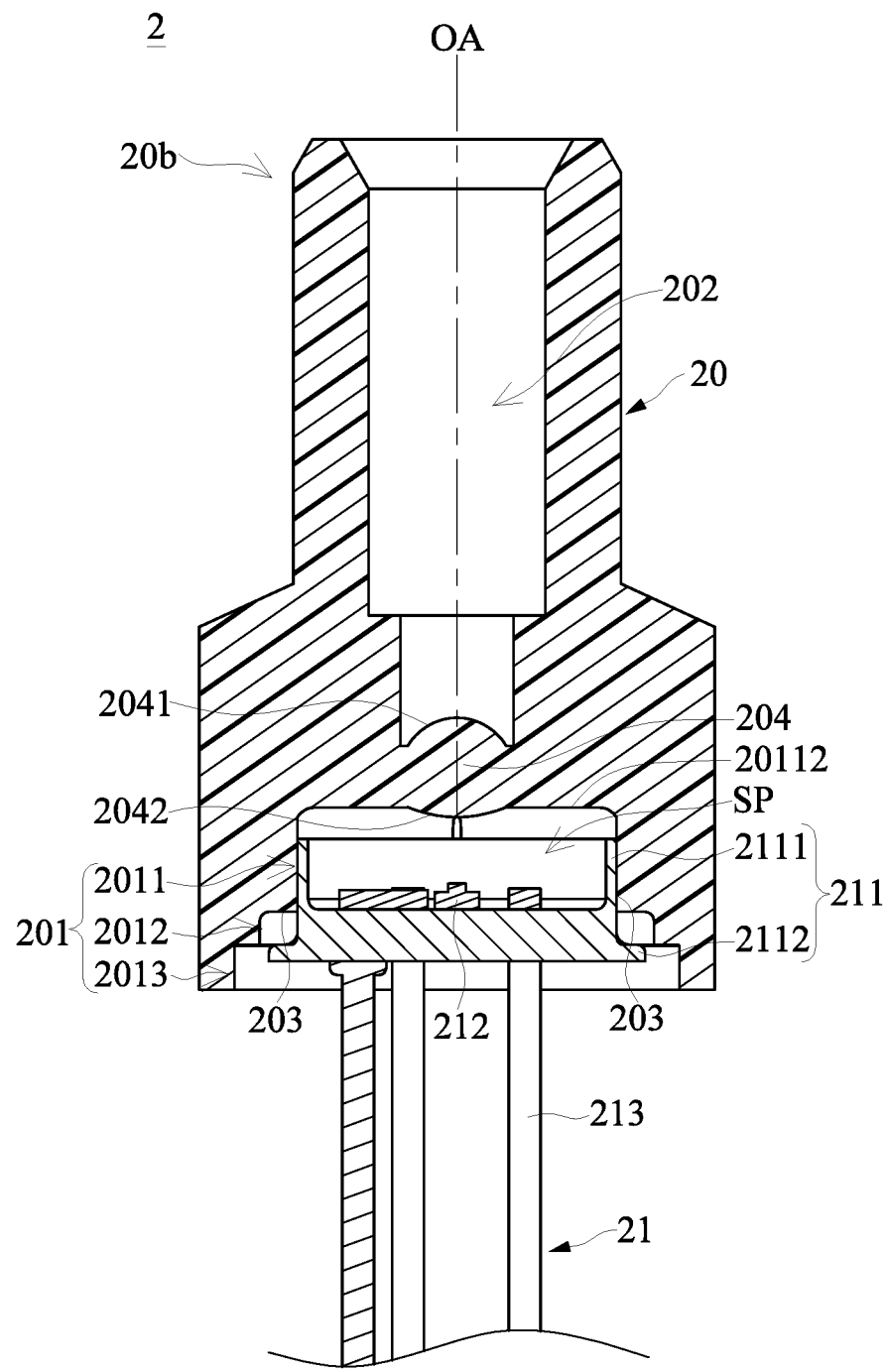
FIG. 10 is a cross-sectional view showing the optical sub-assembly module in the assembled state according to the embodiment of the present disclosure.

Referring to FIG. 10, when the cap 20 and the light source module 21 are fixed to each other, the annular wall 2111 of the base seat 211 is correspondingly located in the first receiving groove 2011, and the four pillar structures 203 correspondingly abut against the periphery of the annular wall 2111 of the base seat 211 such that the base seat 211 is fixedly disposed in the first receiving groove 2011. The recess 21*a* of the base seat 211 and the inner wall 20111 that surrounds the first receiving groove 2011 are configured to commonly form an accommodating space SP. The light emitting unit 212 is correspondingly located in the accommodating space SP, and the light emitting unit 212 is correspondingly located on an optical axis OA of the lens structure 204, such that the light beam emitted from the light emitting component can sequentially pass through the lens structure 204 and the longitudinal groove 202, and then be emitted outward from the connecting end 20*b* of the cap 20.

Figure 15:
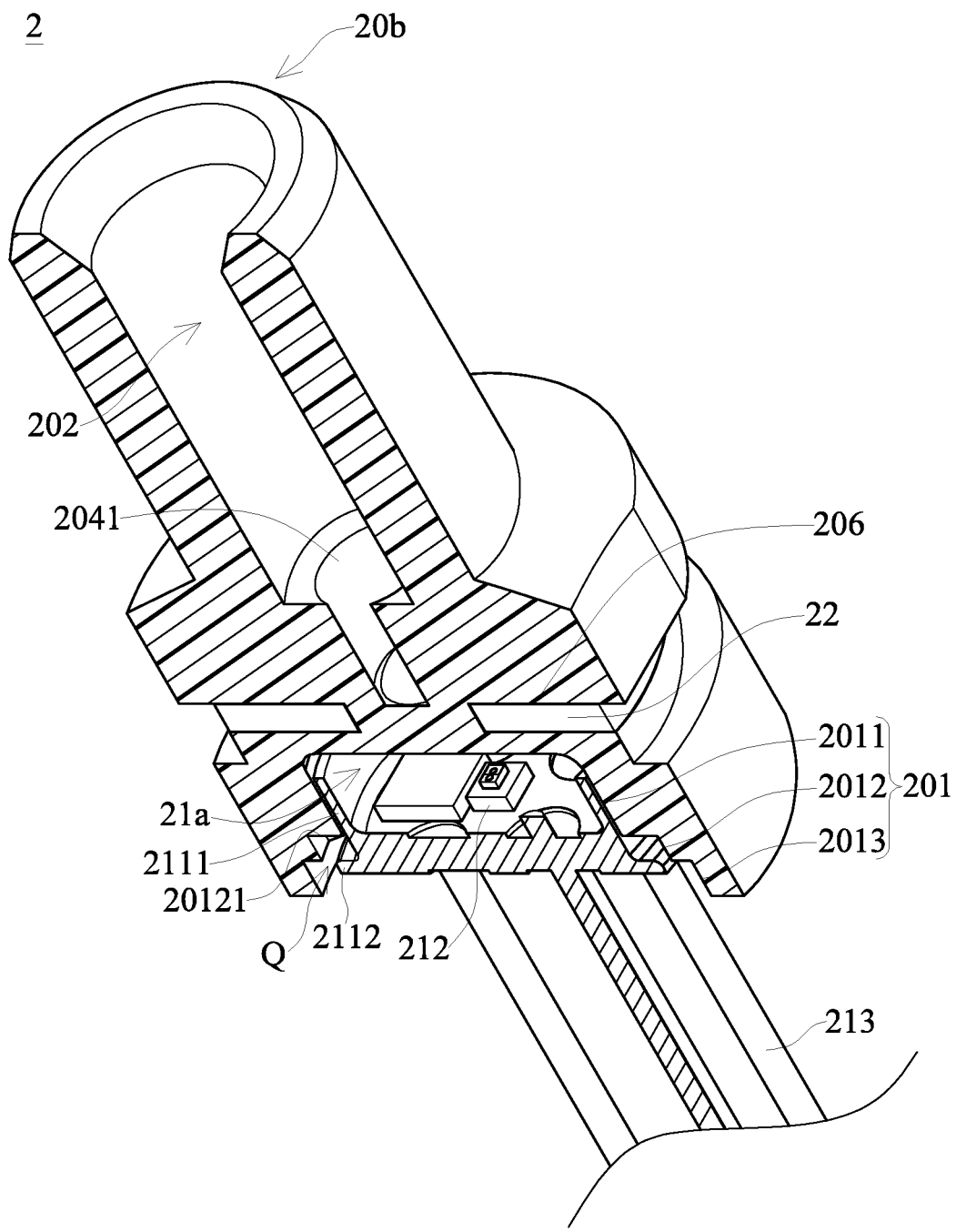
FIG. 15 is a cross-sectional view showing the optical sub-assembly module according to another embodiment of the present disclosure.

Referring to FIG. 8, FIG. 10 and FIG. 15, when the annular wall 2111 is fixedly disposed in the first receiving groove 2011, the bottom plate 2112 of the base seat 211 correspondingly abuts against a side of each of the limiting structures 205 facing toward the light source end 20*a*, and a position of the base seat 211 relative to the cap 20 can be limited by the bottom plate 2112 and the limiting structures 205. In FIG. 10 of the present embodiment, the annular wall 2111 does not abut against a bottom wall 20112 of the first receiving groove 2011, but the present disclosure is not limited thereto. Referring to FIG. 15, when the base seat 211 is fixedly disposed on the end of the cap 20, the bottom plate 2112, the annular wall 2111 and a bottom wall 20122 of the second receiving groove 2012 commonly form a glue receiving space Q which can be filled with glue so as to increase a connecting strength between the base seat 211 and the cap 20.

The production of the above-mentioned optical sub-assembly module can be completed through a trial production stage, a mass production step and/or a mold modification step (for a detailed description of the components described in the following description, please refer to the previous instructions). The trial production stage includes a cap production step, a light source module production step, a mounting step, and a detection step.

The cap production step includes: producing the cap by using a mold.

The light source module production step includes: separately producing the base seat, the light emitting component and the pins; and then assembling the base seat, the light emitting component and the pins into the light source module.

The mounting step includes: assembling the cap and the light source module respectively produced by the above two steps to form the optical sub-assembly module.

The detection step includes: performing a detecting operation on the optical sub-assembly module assembled in the mounting step to confirm whether the light emitting unit is correctly located on the optical axis of the lens structure.

After the detection step is performed, the mass production step is continuously performed if the light emitting unit is correctly located on the optical axis of the lens structure, and otherwise, the mold modification step is performed.

The mold modification step includes: modifying the mold to change a length of the pillar structures that protrudes from the receiving groove according to a result of the detection step.

After the mold modification step is performed, the cap production step will be performed with the modified mold, and the above-described mounting step and detection step will be continuously performed. If the optical sub-assembly module produced by the modified mold passes through the detection step of the trial production stage and the light emitting unit is correctly located on the optical axis of the lens structure, the mass production step is continuously performed.

The mass production step is to repeatedly perform the cap production step (production is carried out with the mold that has passed the detection step of the trial production stage), the light source module production step, the mounting step, and the detection step so as to perform the mass production of the optical sub-assembly module.

Through the above-mentioned production steps of the optical sub-assembly module, the optical sub-assembly module produced by the mass production step can achieve a high yield. That is, most of the optical sub-assembly modules produced by the mass production step have their light emitting units, lens structures and longitudinal grooves on the same axis.

Figure 11:
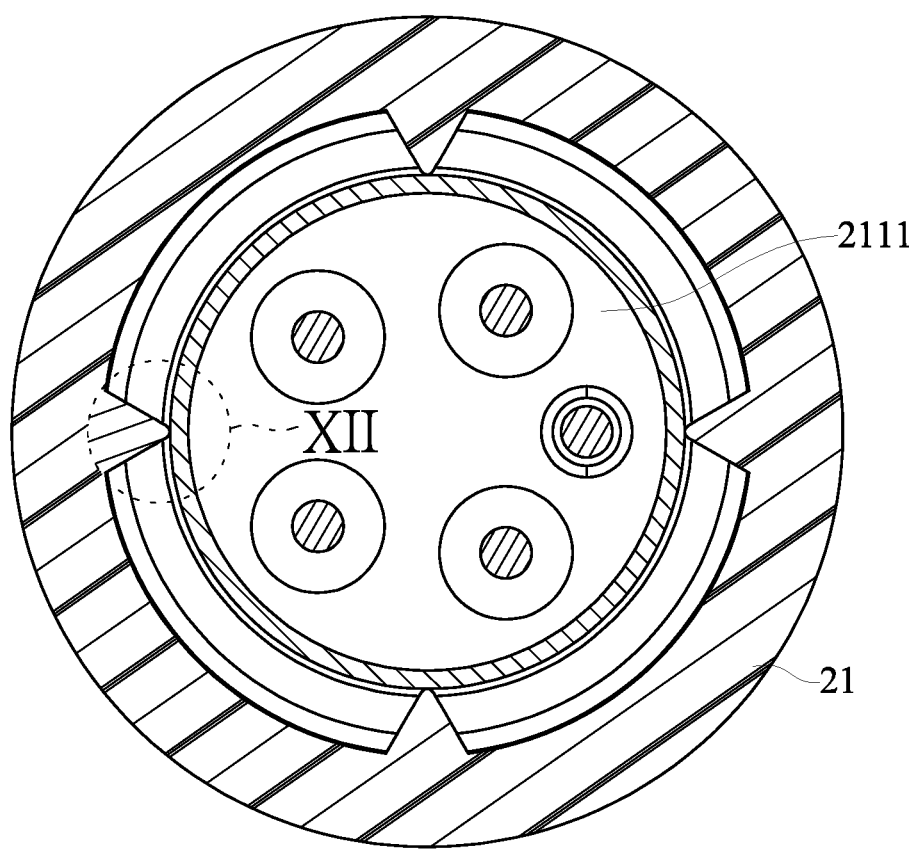
FIG. 11 is a cross-sectional view showing the optical sub-assembly module according to the embodiment of the present disclosure taken along a cross-sectional line XI-XI in FIG. 4
Figure 12:
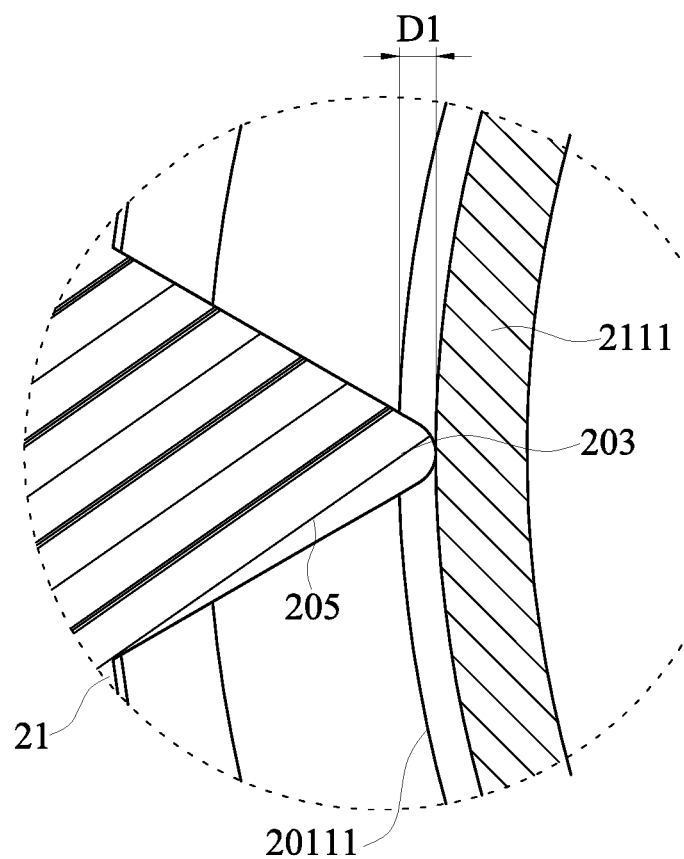
FIG. 12 is a partially enlarged view showing a region XII of FIG. 11

Referring to FIG. 7, FIG. 9, FIG. 11 and FIG. 12, FIG. 11 is a cross-sectional view showing the optical sub-assembly module 2 of the present embodiment taken along a cross-sectional line XI-XI shown in FIG. 4, and FIG. 12 is a partially enlarged view showing a region XII of FIG. 11. As shown in FIG. 9, a length D1 of each of the pillar structures 203 that extends from the first receiving groove 2011 toward the inside of the receiving groove 201 may be a production error value of the first receiving groove 2011 or a production error value of the base seat 211. Since the inner diameter R1 of the first receiving groove 2011 is substantially the same as the outer diameter R2 of the annular wall 2111 of the base seat 211 and since each of the pillar structures 203 extends from the inner wall 20111 (as shown in FIG. 8) that surrounds the first receiving groove 2011 toward the inside of the receiving groove 201, the relevant operator can determine the length D1 of each of the pillar structures 203 that extends toward the inside of the receiving groove 201 according to the outer diameter R2 of the annular wall 2111 of the base seat 211 and the inner diameter R1 of the first receiving groove 2011 that are actually produced in the trial production stage so as to change the length D1 of each of the pillar structures 203 that extends toward the inside of the receiving groove 201 in the following the mass production step though changing the mold for producing the cap 20.

In the above-mentioned trial production stage, when the inner diameter R1 of the first receiving groove 2011 of the cap 20 and the outer diameter R2 of the annular wall 2111 of the base seat 211 are both conforming to expected sizes, the relevant operator can directly perform the mass production step. In the present embodiment, when the base seat 211 is fixedly disposed in the first receiving groove 2011, the four pillar structures 203 correspondingly abut against the outer side of the annular wall 2111 of the base seat 211. That is, the optical sub-assembly module 2 produced in the trial production stage is a product that has passed the detection of the detection step of the trial production stage, and the light emitting unit 212 of the optical sub-assembly module 2 is correctly located on the optical axis OA of the lens structure 204.

It should be noted that the inner diameter R1 of the first receiving groove 2011 of the cap 20 produced in the cap production step of the trial production stage is substantially the same as the outer diameter R2 of the base seat 211, and the four pillar structures 203 respectively extend from the inner wall 20111 that surrounds the first receiving groove 2011 toward the inside of the receiving groove 201 as shown in FIG. 8. Therefore, in the mounting step of the trial production stage, when the inner diameter R1 of the first receiving groove 2011 of the cap 20 and the outer diameter R2 of the annular wall 2111 of the base seat 211 are both conforming to the expected sizes, the base seat 211 can be fixedly disposed in the first receiving groove 2011, and the base seat 211 and the four pillar structures 203 can be brought into a tight fitting relationship. It is worth mentioned that in the practical application, the annular wall 2111 can abut against the four pillar structures 203 by virtue of changing a thickness of the annular wall 2111, such that the base seat 211 and the cap 20 also can be brought into a tight fitting relationship, and the annular wall 2111 will be slightly deformed.

Figure 13:
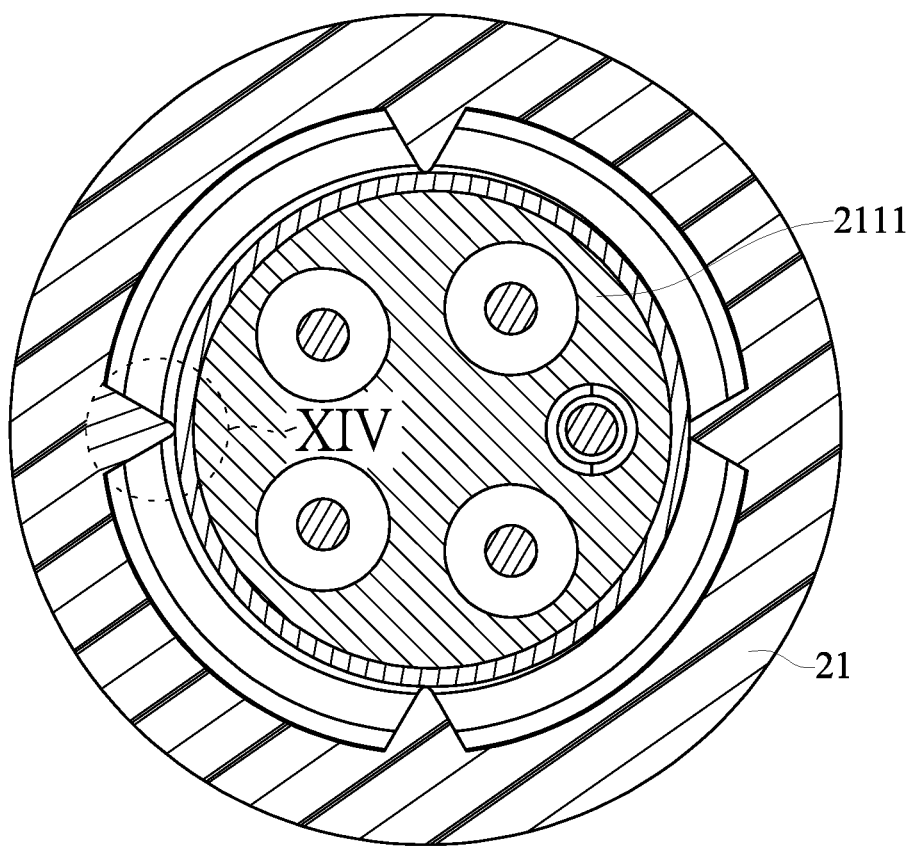
FIG. 13 is a cross-sectional view showing an optical sub-assembly module according to another embodiment of the present disclosure.
Figure 14:
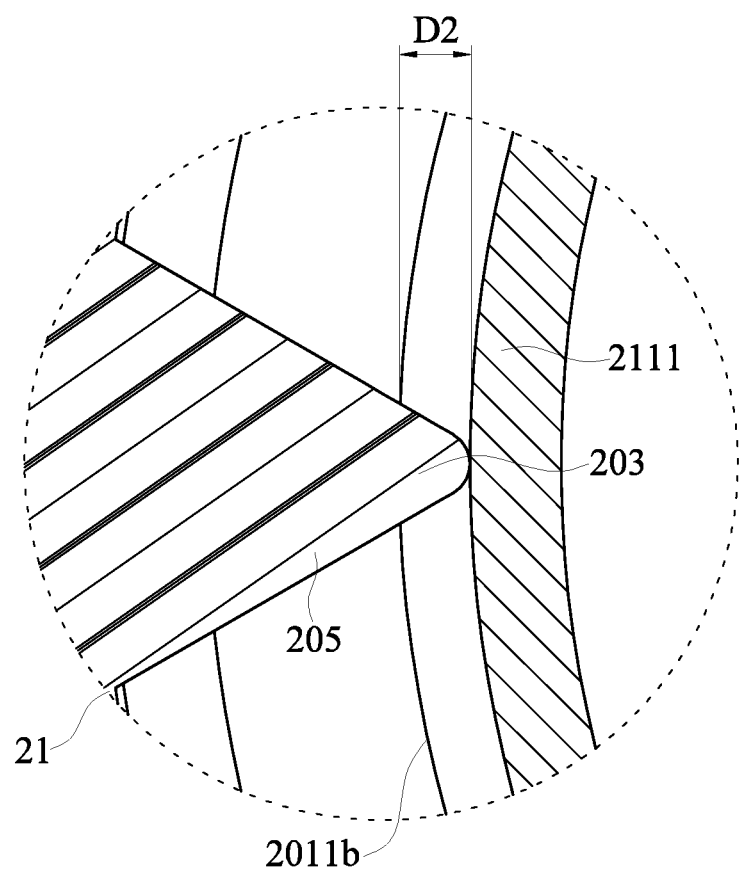
FIG. 14 is a partially enlarged view showing a region XIV of FIG. 13.

Referring to FIG. 13 and FIG. 14, FIG. 13 is a cross-sectional view showing the optical sub-assembly module 2 according to another embodiment of the present disclosure (also taken along a cross-sectional line XI-XI shown in FIG. 4), and FIG. 14 is a partially enlarged view showing a region XIV of FIG. 13. As described above, for the optical sub-assembly module 2 produced from the trial production stage, when the detection step of the trial production stage is performed and the relevant operator finds that the light emitting unit 212 is not correctly located on the optical axis OA of the lens structure 204, the relevant operator can modify the mold for producing the cap 20 in the trial production stage to change the relevant structure of the mold for forming the four pillar structures 203.

In the optical sub-assembly module 2 produced from the modified mold, the lengths D2 of the four pillar structures 203 that respectively extend from the first receiving groove 2011 toward the inside of the receiving groove 201 may be different from each other, and the light emitting unit 212 can be correctly located on the optical axis OA of the lens structure 204 through the pillar structures 203 having at least two different lengths D2. More specifically, the length D2 of the pillar structure 203 that is located at a left side of FIG. 13 and extends from the first receiving groove 2011b toward the inside of the receiving groove 201 is greater than the length (not labeled) of the pillar structure 203 that is located at a right side of FIG. 13 and extends from the first receiving groove 2011 toward the inside of the receiving groove 201.

As described above, in the mass production step, the four pillar structures 203 of the cap 2 may be replaced by three pillar structures 203 depending on the condition of the trial production stage so as to position the light emitting unit 212 on the optical axis OA of the lens structure 204.

Referring to FIG. 15, the optical sub-assembly module 2 of another embodiment of the present disclosure is illustrated. The difference between the present embodiment and the previous embodiment is that the cap 20 further has an outer groove 206. The outer groove 206 is formed inwardly from the periphery of the cap 20. The optical sub-assembly module 2 further includes an anti-electromagnetic structure 22 disposed in the outer groove 206. In a practical application, the anti-electromagnetic structure 22 is disposed around the lens structure 204, and the anti-electromagnetic structure 22 may be formed in the outer groove 206 through an associated molding method after the cap 20 is formed, but the present disclosure is not limited thereto. When the optical sub-assembly module 2 is powered to operate, the probability of external electromagnetic interference can be greatly reduced by the arrangement of the anti-electromagnetic structure 22.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An optical sub-assembly module, comprising:
   a cap, two opposite ends of the cap being respectively defined as a light source end and a connecting end; wherein the cap includes:
      a receiving groove recessed inwardly from the light source end, wherein the receiving groove is divided into a first receiving groove and a second receiving groove, the first receiving groove is disposed close to the connecting end, the second receiving groove is disposed close to the light source end, and the first receiving groove is in spatial communication with the second receiving groove;
      a plurality of limiting structures each located in the receiving groove, and each limiting structure is disposed close to the light source end;
      a longitudinal groove recessed inwardly from the connecting end;
      a lens structure integrally formed with the cap; wherein the lens structure is located between the receiving groove and the longitudinal groove, and the lens structure blocks spatial communication between the receiving groove and the longitudinal groove; and
      a plurality of pillar structures respectively connected to an inner wall that surrounds the receiving groove; and
   a light source module including:
      a light emitting component including a light emitting unit capable of emitting a light beam having a predetermined wavelength;

a base seat, a side of the base seat being concavely formed with a recess, the light emitting component being fixedly disposed in the base seat, and the light emitting component being located in the recess, wherein the base seat has an annular wall and a bottom plate, and the annular wall is fixedly disposed on a side of the bottom plate; and a plurality of pins respectively and electrically connected to the light emitting component, and the pins being respectively and electrically connected to the light emitting unit;

wherein the base seat is disposed in the receiving groove, and each pillar structure is configured to correspondingly abut against a periphery of the base seat such that the base seat is fixedly disposed at the light source end of the cap;

wherein the light beam emitted from the light emitting component can sequentially pass through the lens structure and the longitudinal groove, and then be emitted outward from the connecting end of the cap;

wherein an inner diameter of the first receiving groove is the same as an outer diameter of the annular wall, and an inner diameter of the second receiving groove is greater than the inner diameter of the first receiving groove;

wherein each limiting structure extends from an inner wall that surrounds the second receiving groove toward the inside of the receiving groove, and the limiting structures are spaced apart from each other, and wherein when the base seat is fixedly disposed in the cap, the bottom plate abuts against a side of each limiting structure, and the bottom plate, the annular wall and a bottom wall of the second receiving groove commonly form a glue receiving space which can be filled with glue to increase a connecting strength between the base seat and the cap.

2. The optical sub-assembly module according to claim 1, wherein an inner diameter of the receiving groove is the same as an outer diameter of the base seat, and each pillar structure extends from the inner wall of the receiving groove toward the inside of the receiving groove; wherein a number of the pillar structures of the cap is four, two of the pillar structures are disposed to face each other, and the other two of the pillar structures are disposed to face each other.

3. The optical sub-assembly module according to claim 1, wherein an outer diameter of the bottom plate is greater than the outer diameter of the annular wall, the outer diameter of the annular wall is the same as the inner diameter of the receiving groove; wherein when the base seat is fixedly disposed in the receiving groove, the bottom plate correspondingly abuts against positions of the limiting structures close to the light source end, such that the limiting structures are capable of limiting a range of motion of the base seat relative to the cap.

4. The optical sub-assembly module according to claim 1, wherein each limiting structure is a triangular columnar structure, and a side edge portion of each limiting structure abuts against the periphery of the base seat; wherein each side edge portion is located within an outline of an orthographic projection of the first receiving groove toward the light source end, and each pillar structure is formed by the corresponding side edge portion extending toward the first receiving groove.

5. The optical sub-assembly module according to claim 1, wherein the lens structure has a light exit surface facing towards the longitudinal groove and a light incident surface facing towards the receiving groove, and the light exit surface and the light incident surface are multiple curvature surfaces, respectively.

6. A cap of an optical sub-assembly module, two opposite ends of the cap being respectively defined as a light source end and a connecting end; wherein the cap comprises:

a receiving groove recessed inwardly from the light source end; wherein the receiving groove is divided into a first receiving groove and a second receiving groove, the first receiving groove is disposed close to the connecting end, the second receiving groove is disposed close to the light source end, and the first receiving groove is in spatial communication with the second receiving groove;

a plurality of limiting structures each located in the receiving groove, and each limiting structure is disposed close to the light source end; and wherein each limiting structure is a triangular columnar structure, each side edge portion is located within an outline of an orthographic projection of the first receiving groove toward the light source end, and each pillar structure is formed by the corresponding side edge portion extending toward the first receiving groove;

a longitudinal groove recessed inwardly from the connecting end;

a lens structure integrally formed with the cap; wherein the lens structure is located between the receiving groove and the longitudinal groove, and the lens structure blocks spatial communication between the receiving groove and the longitudinal groove; and a plurality of pillar structures respectively connected to an inner wall that surrounds the receiving groove.

7. The cap of the optical sub-assembly module according to claim 6, wherein the inner diameter of the second receiving groove is greater than the inner diameter of the first receiving groove; wherein each limiting structure extends from an inner wall that surrounds the second receiving groove toward the inside of the receiving groove, and the limiting structures are spaced apart from each other.

8. The cap of the optical sub-assembly module according to claim 6, wherein the lens structure has a light exit surface facing towards the longitudinal groove and a light incident surface facing towards the receiving groove, and the light exit surface and the light incident surface are multiple curvature surfaces, respectively.

* * * * *